Aug. 18, 1959            V. L. FARRIS            2,899,983
METHOD AND APPARATUS FOR REPAIRING A FLUID PRESSURE LINE
Filed March 24, 1958            3 Sheets-Sheet 1
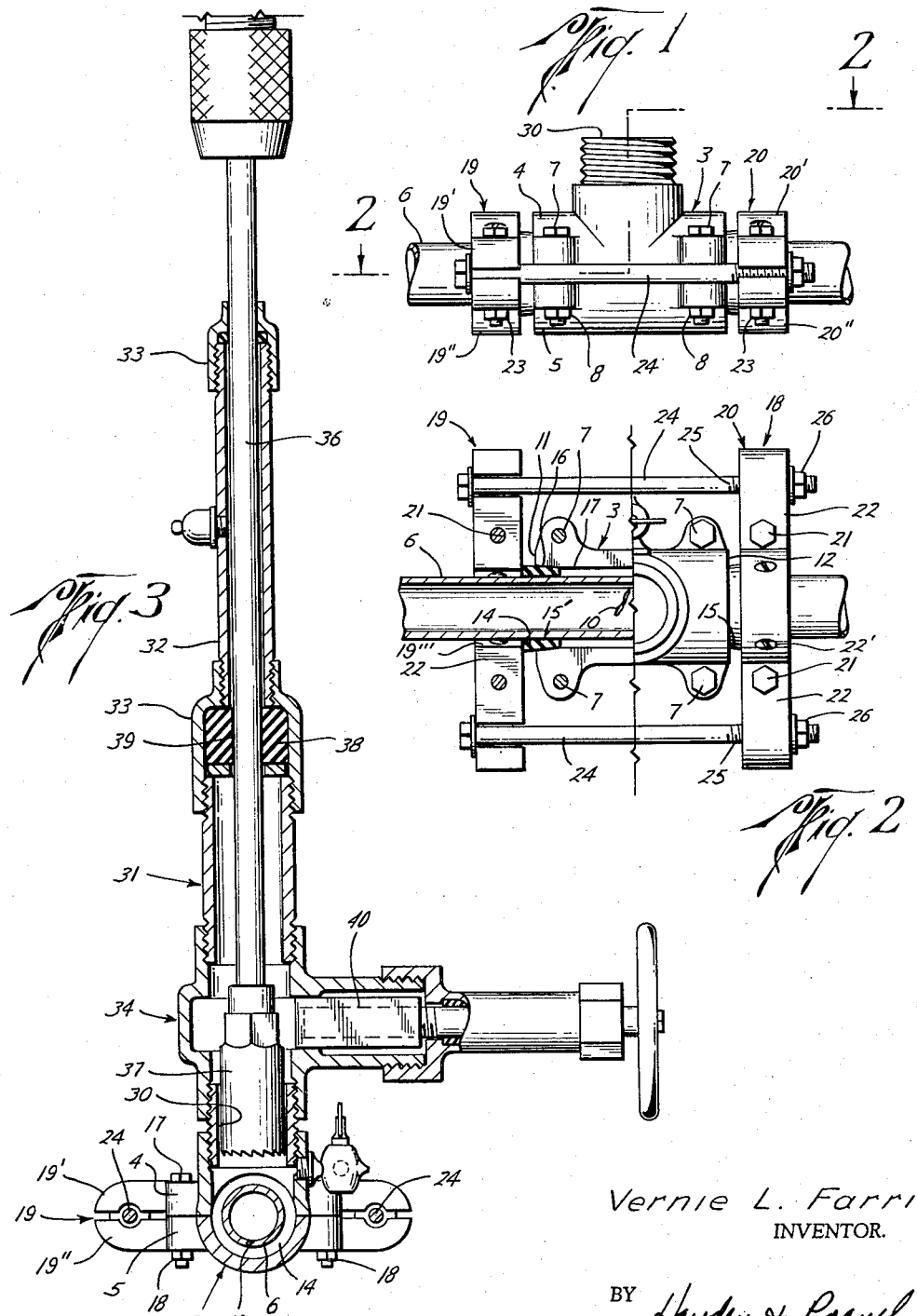
Vernie L. Farris
INVENTOR.
BY Hayden & Pravel
ATTORNEYS

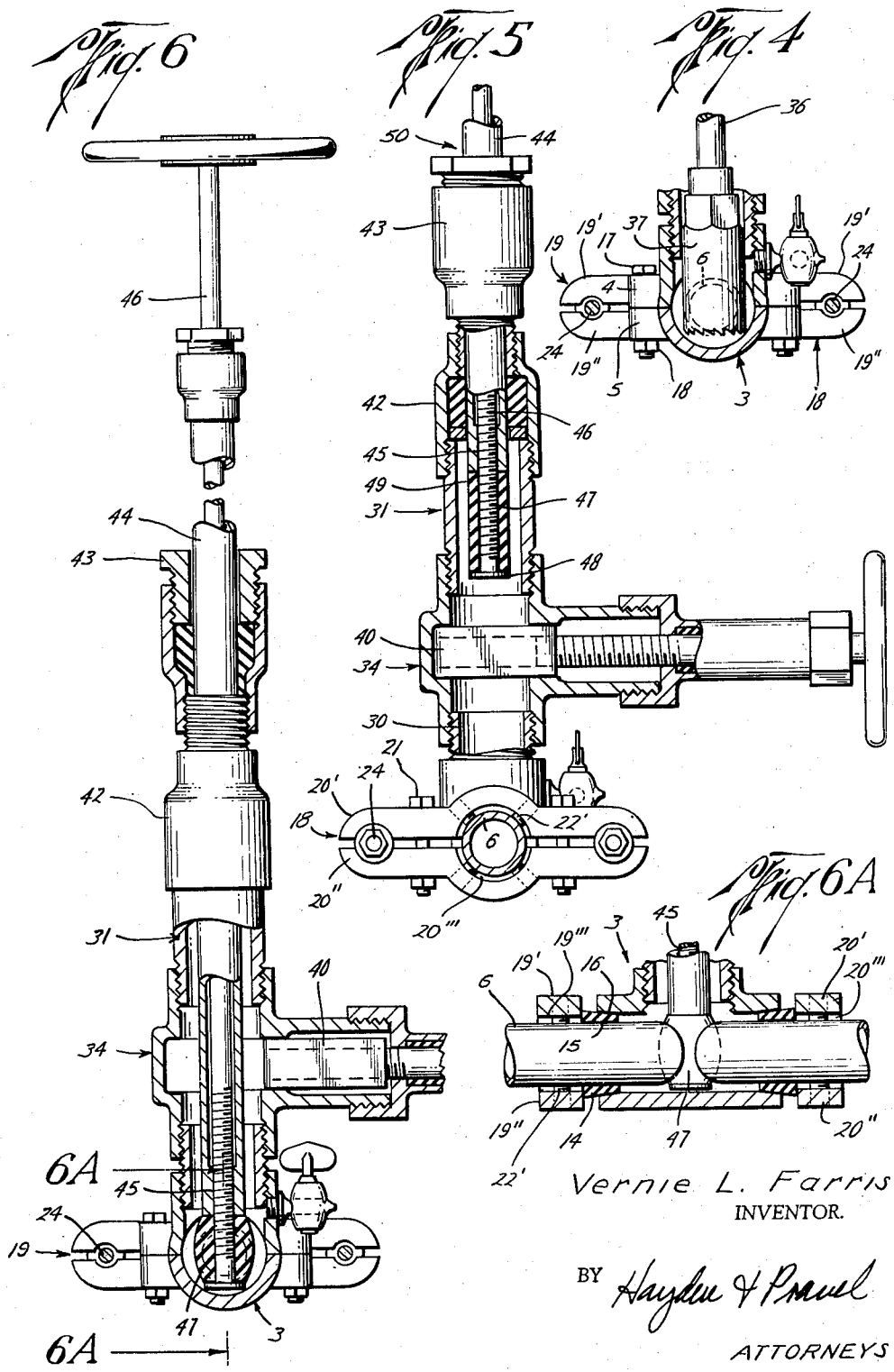

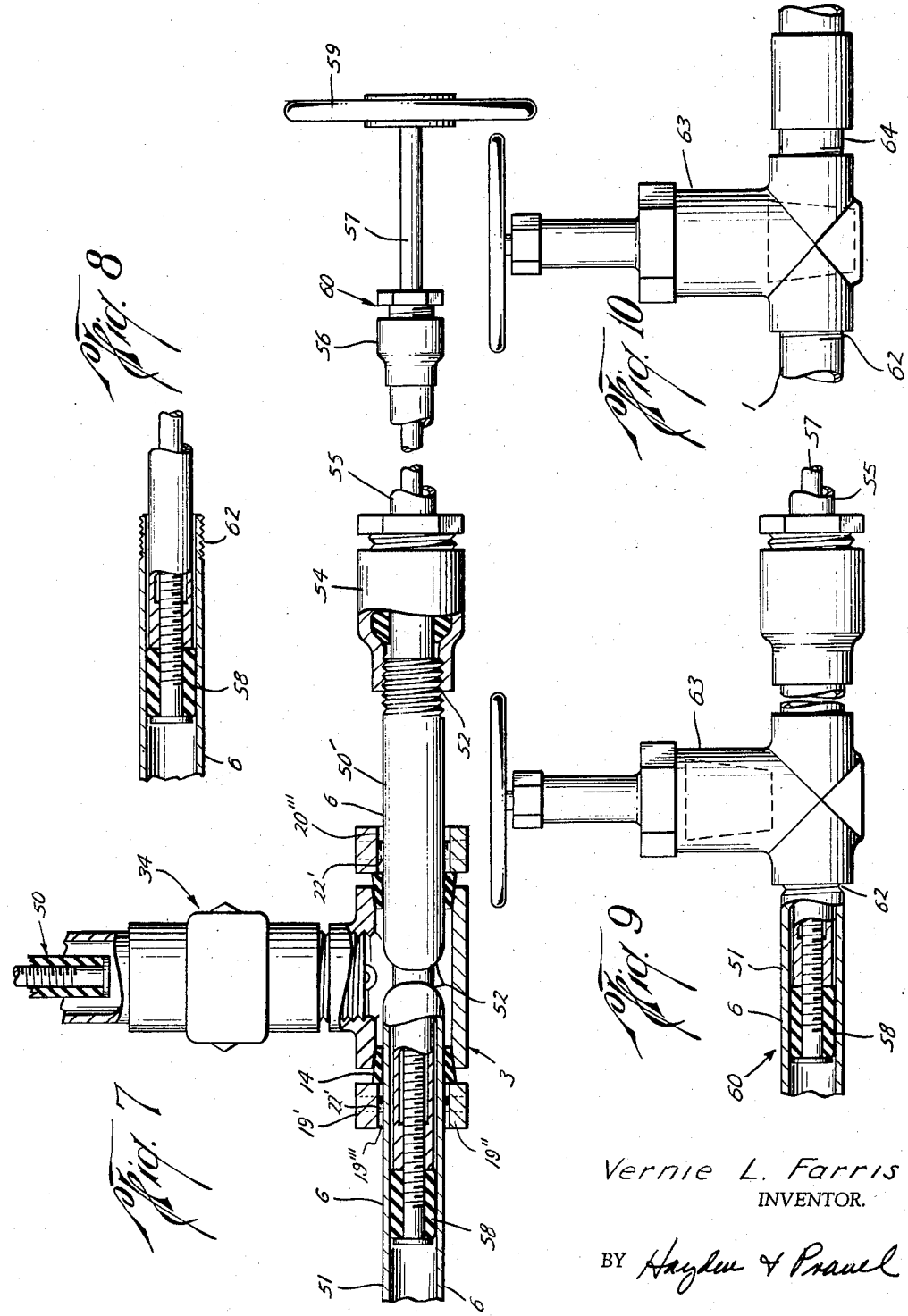

United States Patent Office 2,899,983
Patented Aug. 18, 1959

2,899,983

METHOD AND APPARATUS FOR REPAIRING A FLUID PRESSURE LINE

Vernie L. Farris, Houston, Tex.

Application March 24, 1958, Serial No. 723,585

3 Claims. (Cl. 138—97)

The present invention relates to a method and apparatus for repairing fluid conducting lines under pressure.

Various methods and apparatus have been proposed in an endeavor to repair fluid conducting lines under pressure to avoid the necessity of shutting off flow through the conduit while repairs are being made. At the present time, no satisfactory solution exists whereby any conduit, regardless of its size, or regardless of what may be flowing through the conduit may be repaired without seriously interrupting the flow of fluid through the line.

The present invention provides a method and apparatus whereby fluid flow lines may be quickly and easily repaired without unduly interrupting the flow through the lines.

Yet a further object of the present invention is to provide a method and apparatus for repairing fluid flow lines, wherein the fluid flow line may be repaired without first cutting off flow through the line at some remote location.

Still another object of the invention is to provide a method and apparatus for repairing a fluid line under pressure wherein the pressure in the line may be shut off at the point of repair while repairs are being made.

Other objects and advantages of the present invention will become more readily apparent from a consideration of the following description and drawings wherein:

Fig. 1 is a side elevation illustrating the body portion of the present invention connected over a fluid pressure line for repairs of the line;

Fig. 2 is a partial sectional, partial elevational top view on the line 2—2 of Fig. 1 showing the construction of the body shown in Fig. 1 and in more detail, its relationship to a fluid line about which it is positioned;

Fig. 3 is a vertical sectional view, partly in elevation, showing the body of Figs. 1 and 2 in end view positioned about a fluid line on which repairs are to be made, and also showing a conduit and valve means connected laterally with the body to aid in effecting repairs on the line enclosed by the body with a cutting tool inserted through the conduit and valve to effect a cut on the fluid pressure line;

Fig. 4 is a view somewhat similar to Fig. 3 but showing only the lower portion of Fig. 3 and illustrating the cutting tool of Fig. 3 as having moved to a position in the body to sever the fluid line that is to be repaired;

Fig. 5 is a vertical sectional view somewhat similar to Fig. 3, partly in elevation, showing the valve means of Fig. 3 closed and a seal means inserted within the conduit for temporarily closing off flow at the severed portion in the fluid flow line;

Fig. 6 illustrates the next position of the apparatus with the seal or plug means of Fig. 5 in position between the severed fluid conducting conduit portion;

Fig. 6A is a side view on the line 6A—6A of Fig. 6 to more clearly illustrate the position and relationship of the seal or plug between the severed pipe ends;

Fig. 7 is a sectional view, partly in elevation, of the apparatus showing the seal means or plug means of Fig. 6 as having been withdrawn above the valve in the conduit, and an additional plug means as having been inserted longitudinally of the fluid conducting line and seated upstream of the severed portion so as to temporarily close off flow through the line;

Fig. 8 is a sectional view, partly in elevation, illustrating the plug of Fig. 7 in position in the line on the upstream side of the severed portion, and with the body and other components of the present invention removed therefrom and with the end of the severed pipe portion threaded to receive a connection thereon;

Fig. 9 illustrates the next step and shows the severed pipe portion of Fig. 8 in partial section with a valve in elevation as having been secured on the threaded end; and Fig. 10 is an elevation of the valve of Fig. 9 showing the severed and subsequently repaired pipe portion on the left of the valve which is represented in dotted line as being closed and a new line is illustrated to the right of the valve as having been connected into the other side of the valve and connected to the remainder of the old fluid flow line whereby flow may continue through the repaired conduit.

Attention is directed to Figs. 1 and 2 of the drawings wherein a body 3 is shown as including the mating upper half portion 4 and a lower half portion 5, which portions are adapted to be secured about the conduit 6, which conduit is to be repaired because of a leak or break therein. The half portions include longitudinal recesses which form the passage 17 surrounding the conduit 6. The upper portion 4 and the lower half portion 5 may be secured about the conduit in abutting relationship to each other and held in such position by means of the bolts 7 which extend through the half portions 4 and 5 and are retained in position by means of the nuts 8 which are adapted to threadedly engage the bolts 7.

Reference is made to Fig. 2 wherein a crack or leak in the conduits 6 is represented by the numeral 10. It will be noted that the body 3 is positioned so that it covers the leak 10 in the fluid conducting member 6, the body 3 being positioned so that the leak 10 is between the ends 11 and 12 of the body 3. In order to inhibit the leakage of fluid from the conduit 6 through the crack 10 and out the body, suitable annular seals as illustrated at 14 and 15 are provided at each end of the body 3 for sealably fitting about the periphery 15' of the pipe and the periphery 16 of the passage 17 formed by the mating longitudinal recesses in the two mating half portions 4 and 5 of the body 3, as previously described. It will be noted that the periphery 16 of the passage 17 is tapered at each end of the body 3 so that as the packing 14 is urged into the body 3, a tight sealing fit will be formed by the packing 14 with the conduit 6 and the body 3.

To aid in positioning the packing 14 in the body member 3 initially, and to maintain it in position in the body 3, suitable clamp means as illustrated generally by the numeral 18 are provided. The clamp means 18 not only provide a means for positioning the packing 14 in the body 3, but also provide a means for maintaining the packing and the body in position on the conduit 6 as the method and apparatus of the present invention are used to repair the crack 10 in the conduit 6. The securing means 18 is in the form of clamps 19 and 20, positioned adjacent each end 11 and 12 of the body 3 respectively, with each of the clamps 19 and 20 including mating half portions 19', 19", and 20', 20", respectively.

In order to retain the two half portions 19' and 19", as well as the half portions 20' and 20" in position on the conduit 6, suitable means such as the bolts 21 are provided which extend through the laterally extending portions 22 of the half portions 19', 19" and 20', 20", respectively. Nuts 23 may be threadedly secured on the bolts in order to retain the half portions 19' and 19" secured together, and for maintaining the half portions 20' and 20" secured together. In order to maintain the seals 14 and the body 3 in proper position relative to each other and relative to the crack 10 in the conduit 6, suitable connectors or elongated bolts as illustrated at 24 are provided, which extend between the clamps 19 and 20, which connectors are illustrated as being in the form of rods that extend longitudinally and on each side of the body 3 in spaced relation thereto, and in spaced relation relative to the conduit 6. The connectors 24 may be suitably threaded as illustrated at 25 at one end so that a nut 26 may be engaged therewith, whereby the clamps 19 and 20 may be urged toward each other longitudinally along the conduit 6, by tightening the nut 26, whereupon the packing 14 and 15 at each end of the body 3 is forced inwardly along the passage 17 to form a tight fit between the periphery 15' of the conduit 6 and the periphery 16 of the passage 17.

After the portions 4 and 5 are positioned over the conduit 6 so as to enclose crack 10 therein, the bolts 7 and nuts 8 may be placed in position on the body and tightened. The seals 14 and 15 may be in the form of split annular rings and are positioned over the pipe 6 and in each end 11 and 12 of the body 3. The clamps 19 and 20 are then positioned over the pipe 6 and bolts 21 and nuts 23 positioned therein and tightened. The clamps 19 and 20 each have an opening 19''' and 20''' therethrough which is larger than pipe or conduit 6. In order to grip the conduit 6 and hold it in line as the present invention is used, set screws 22' are threadedly engaged in each clamp 19 and 20 as shown in Figs. 1–6 and 7. The set screws may be rotated to engage against pipe 6 as shown in Figs. 5 and 7 to hold it during the cutting operations as well as the other operations performed during use of the present invention.

Thus, the crack 10 is positioned within the body 3 and between the seals 14 and 15 so that such crack is effectively sealed off within the body as shown in Fig. 2.

A lateral opening 30 extends from the body and a conduit 31 is shown in Fig. 3 as connected with such opening for a purpose as will be more suitably described hereinafter. The conduit 31 includes suitable fittings as illustrated at 32 and 33, the latter comprising packing glands to further aid in sealing off the crack 10 within the body 3 as will be described in more detail hereinafter. A valve means as shown at 34 is also mounted in the conduit 31 and controls communication between the conduit 31 and the opening 30 in the body 3. It will be noted that the fitting 31 is axially and longitudinally aligned relative to the opening 30 so that when the valve 34 is open, access may be had through the conduit 31 to the damaged portion of the conduit 6 between the seals 14 and 15 at each end of the body 3.

When the body 3 is positioned on the conduit 6, the fitting 31 including the valve 34 and the packing glands 33, are simultaneously positioned on the opening 30, and the valve 34 moved to closed position so that the crack illustrated at 10 in the conduit 6 is completely sealed off within the body 3 between the ends 11 and 12 thereof.

The next operation in the present invention is to cut or sever the fluid conducting conduit 6 in two and this is accomplished by removing the fitting 32 and the lower packing gland 33 so that they may be positioned on the brace 36. Thereafter, the bit or cutting tool 37 is positioned on the lower end of the brace and the packing gland 33 is threadedly positioned as shown in Fig. 3 of the drawings so that the seal 38 therein engages the periphery 39 of the brace 36 to inhibit loss of pressure through the crack 10 from the fluid conduit 6 when the valve 34 is opened. After the fitting 31, including the packing glands 33 and the fitting 32 have been repositioned on the conduit 31 as shown in Fig. 3 of the drawings, the valve 34 may be opened and the cutting tool 37 lowered into engagement with the conduit 6 so as to sever the conduit 6 at the point of the crack or break 10. This is accomplished merely by rotating the brace 36 either by manual or power operation and it will be noted that the bit 37 is of larger diameter than the diameter of the conduit 6 so that as it cuts through the pipe, it completely cuts the pipe or conduit 6 into two separate portions.

This is illustrated more clearly in Fig. 4 wherein the cutting tool 37 is represented as being in its final position after it has completely severed the pipe 6 in two. Thereafter, the cutting tool, including the bit 37 and brace 36 can be retracted above the valve 34 and the plug or gate 40 of the valve moved to sealing position so as to inhibit the leakage of fluid from the body 3. After the gate 40 has been moved to closed position in the valve 34, the lower packing gland 33 may be removed and the bit 37 taken off the brace 36 so that the packing glands 33 and fitting 32 can be removed from the brace 36 to be readied for the next operation.

Of course, during this time, fluid is passing through the conduit 6 and escape of fluid from the conduit 6 and through the body 3 is prevented by means of the valve 34 and the seals 14 and 15. To effect further repairs on the conduit 6, it is necessary to temporarily shut off the flow at the severed portion of the conduit 6 and this may be accomplished by the pack-off tool illustrated in Figs. 5 and 6 in its initial and in its final position respectively, in the device.

In Fig. 5 the fitting 31 is illustrated as being provided with a packing gland 42 and a packing gland 43 which fit about the housing 44, which housing extends longitudinally therethrough. The housing 44 is threadedly connected as illustrated at 45 to the threaded rod 46 which has at its lower end, an annular packing member 47 retained in position by the enlargement 48 on the lower end of the threaded rod 46 and which abuts the lower end 49 of the housing 44. In its initial position the packing member which may be designated generally by the numeral 50 is positioned above the closed valve 34, as shown in Fig. 5, where the gate 40 of the valve 34 is illustrated as being in its seated position. When it is desired to seal off, or close off flow in the fluid conduit 6 at the point of the cut formed by means of the cutting tool, previously described with regard to Fig. 3, the valve 34 may be opened and the device 50 lowered through the opening 30 to seat in the conduit 6 between the portions thereof which have now been cut in two. When the device 50 has been seated in the conduit 6, the rod 46 may be rotated, whereupon such rotation is transmitted through the housing 44 to the threaded connection between the rod 46 and housing 44 as illustrated at 45. Since the housing 44 is fixed as shown in Fig. 6, rotation of the rod 46 moves the rod relative to the housing 44 and expands the packing element 47 so as to seal between the severed portions of the fluid conducting line 6. This shuts off flow through the fluid line 6 and the next step in practicing the present method and invention can proceed.

After the seal 50 is in place between the severed portions of the conduit 6 as shown in Figs. 6 and 6A, the line 6 may be severed downstream of the body 3, and since the pressure in line 6 is sealed off by the plug 47, no leakage will occur. A portion of the line 6 may be cut out, or bent out of the way downstream of the body 3 to gain access to the portion 50' of the line 6 which is downstream of the body 3.

Reference is now made to Fig. 7, wherein it will be noted that access has been gained to the fluid conducting line 6 downstream of the body 3, and a suitable length or portion of such conduit downstream of the body 3 has been severed and then bent out of the way, as desired. In Fig. 7, the reference numeral 50' represents the downstream portion of the fluid conducting line 6 connected to body 3 and the reference numeral 51 represents the upstream portion of the fluid conducting line 6 connected to the body 3 adjacent the cut 52 which has been made in the conduit 6 in the body 3 of the device by means of the cutting tool previously described with regard to Fig.

3. The packing gland 54 may be threadedly secured on the end 51 of the downstream portion 50', which packing gland is adapted to receive therethrough the housing 55 which terminates at one end in the packing gland 56. A rod 57 extends through the packing gland 56 and housing 55 and is provided at its inner end with a packing element 58 similar to the packing element 47, previously described with regard to Fig. 6 of the drawings. It will be noted that the packing tool, designated generally by the numeral 60 in Fig. 7 is similar in construction to the packing tool designated generally by the numeral 50 in Fig. 5 of the drawings.

It will be noted in Fig. 7 that the portion 50' of the fluid conduit 6 has been threaded at its end as illustrated at 52, after the conduit 6 downstream of the body 3 has been cut in two, and it will be appreciated that the portion of the conduit 6 immediately to the right of the portion 50' shown in Fig. 7 will have been cut and then removed, or cut and bent out of the way so that the thread 52 can be formed on the end of the downstream portion 50'.

Also, the operation of the packing tool 60 is similar to the operation of the packing tool 50, in that when the rod 57 is rotated by means of the member 59, the packing element 58 expands and forms a seal within the conduit 6. Initially, the member 58 will be moved to a position within the portion 50' of the conduit 6 and the rod 57 rotated so that the member 58 forms a seal within the portion 50. Thereupon, the packing tool 50 may be withdrawn through the opening 30 in body 3 and up through the conduit 31 to a position above the valve 34 as shown in Fig. 7. The valve 34 may then be closed so as to inhibit loss of fluid from the conduit 6 and thereafter the packing tool 60 may be released from its initial position in the portion 50' of the conduit 6 and moved longitudinally thereof to a position upstream relative to the cut portion 52 of the conduit 6 and expanded in the portion 51 of line 6 as illustrated in Figs. 7, 8 and 9 of the drawings.

Fig. 9 represents one of the last steps of the present invention, and it should be appreciated that in this stage, any one of several alternate procedures may be followed. As illustrated in Fig. 9, the portion 51 of the conduit 6 has been threaded as illustrated at 62 in Fig. 8 by any suitable threading apparatus, and a valve as illustrated at 63 has been engaged on the threads 62.

Of course, since the packing tool illustrated at 60 has formed a seal upstream relative to the cut 52 in the conduit 6, the body 3, as well as the clamps 19 and 20 will have been removed from about the conduit 6 prior to forming threads 62. Also, since the packer tool 60 forms a seal upstream relative to the cut portion 52, the packing glands 54 and 56, as well as the portion 50' of the conduit 6 may also be removed by taking off handle 59, whereupon gland 56 can be unthreaded from the end of housing 55 and then slipped off over rod 57. Similarly, gland 54 can then be unthreaded from 50' and slipped off over housing 55 and rod 57; thereafter, portion 50' may be removed by slipping it off over housing 55. This leaves in position the housing 55 with the rod 57 extending therethrough and the expanding packer element 58 seated upstream as previously mentioned, and as shown in Fig. 9 of the drawings. The valve 63 may thereafter be positioned on the threads 62 by slipping it along over rod 57 after handle 59 has been removed so that the valve 63 can be positioned on threads 62.

After the valve 63 has been positioned on the portion 51 of the conduit 6, a fitting or nipple 64 may be threadedly secured into the other end of the valve 63, whereupon the packing tool 60 can be retracted longitudinally along the conduit 6 so as to be thereafter expanded and seat within the fitting 64. When this has occurred, the valve 63 can be closed to shut off communication from the portion 51 to the nipple 64 so that thereafter, additional nipples or fittings can be connected between the nipple 64 and the remainder of the old flow line which has been previously bent out of the way, as described so as to place the flow line 6 back into service.

For example, attention is directed to Fig. 10, wherein the valve 63 is shown as being connected into the conduit 6 by means of being secured into the portion 51 at one side thereof and into the fitting 64 which has now become a part of the permanent conduit. The other end of the conduit can be coupled into the remainder of the flow line 6 which is now ready to be placed back into service merely by opening the valve 63.

It can be appreciated that all of the foregoing operations have been conducted without cutting off the flow through the conduit at a remote source relative to the crack or break in the fluid conduit 6.

Furthermore, the body 3, as well as the clamps 19 and 20 may be rapidly secured about the conduit 6 and positioned over the crack 10 so as to first of all effect a cutting operation in the conduit 6 described with regard to Fig. 3. Thereafter, the sealing tool 50 may be moved through the conduit 31 to close off the cut pipe 6, while the portion of the conduit 6 downstream of the cut is being removed so that the packer tool 60 can be moved longitudinally into the portion 50' of the cut pipe 6. Thereafter, the packing tool 50 may be retracted above the valve 34, the valve 34 closed, and the packing tool 60 moved longitudinally through the body 3 so as to seat upstream in the conduit 6.

After this has taken place, the body 3 and the clamps 19 and 20 may be removed from the conduit 6 so that fittings, as desired, may be connected to the portion 51 of the conduit 6 to connect it with the remainder of the line so that it can be immediately placed into operation.

It should be appreciated from the foregoing description that certain minor modifications and changes can be made in the apparatus of the present invention, without departing from the scope of the procedure or the function of the apparatus.

Also, it can be appreciated that if the pressure in the conduit 6 becomes excessive, then it may be necessary to use more than one seal 58 and it is contemplated that such change can be effected without departing from the scope of the present invention. The invention has particular utility, in that repair of a leak or crack in a fluid line can be effected without the trouble of shutting off flow throughout the line for a lengthy period of time. However, the flow through the line is only cut off at the break for a minimum amount of time, while repairs are made on the line.

A test cock is shown in Figs. 2, 3, 4, 5 and 6 on body 3, and as desired this can be opened to determine if the packer tools 50 and 60 are maintaining proper seals within the apparatus.

Broadly the invention relates to a method and apparatus for repairing a break in a pressure fluid line.

What is claimed is:

1. A method of repairing a fluid line under pressure including the steps of sealing off about the fluid line in the portion to be repaired, cutting the fluid line in the sealed off portion, sealing off between the cut portions of the fluid line, sealing off the fluid line downstream of the seal between the cut portions, removing the seal between the cut portions while maintaining the seal about the cut portions and the seal downstream of the cut portion, thereafter moving the downstream seal to a position upstream of the cut portion whereby repair operations may proceed while the fluid pressure is sealed off by the upstream seal.

2. A device for repairing a fluid line under pressure including a body, means for securing said body on the fluid line to be repaired, said body including two half-portions fitting about the fluid line, said securing means including means extending through said body half portions to hold them together about the fluid line, clamps positioned at each end of said body and fitting around the fluid line to be repaired, means extending through said clamps to hold them on the fluid line, a connection extending between each of said clamps on each side of and longitudinally of said body which are adapted to move said clamps longitudinally toward each other and toward the adjacent end of said body, seal means fitting in the ends of said body and abutting said clamps, said seal means adapted to be urged to sealing position between said body and the fluid line to seal off the fluid line within said body when said clamps are moved toward each other by said connectors, a lateral opening in said body between said seals, a conduit secured in said opening and extending from said body, and valve means in said conduit for closing off said conduit and for opening said conduit for access to said body.

3. A device for repairing a fluid line under pressure including a body, means for securing said body on the fluid line to be repaired, said body including two half portions fitting about the fluid line, said securing means including means extending through said body half portions to hold them together about the fluid line, clamps positioned at each end of said body and fitting around the fluid line to be repaired, means extending through said clamps to hold them on the fluid line, a connection extending between each of said clamps on each side of and longitudinally of said body which are adapted to move said clamps longitudinally toward each other and toward the adjacent end of said body, seal means fitting in the ends of said body and abutting said clamps, said seal means adapted to be urged to sealing position between said body and the fluid line to seal off the fluid line within said body when said clamps are moved toward each other by said connectors, a lateral opening in said body between said seals, valve means for closing off said opening, conduit means longitudinally and axially aligned with said opening and secured to said valve means, packing means in said conduit means whereby an instrument may be inserted through said conduit and valve means for access to the fluid line under pressure through said lateral opening while said packing means seals off around said instrument to inhibit leakage from the fluid line.

References Cited in the file of this patent
UNITED STATES PATENTS

| | | |
|---|---|---|
| 1,743,338 | Field | Jan. 14, 1930 |
| 2,763,282 | Reedy et al. | Sept. 18, 1956 |